United States Patent
Ramesh et al.

(10) Patent No.: US 8,538,464 B2
(45) Date of Patent: Sep. 17, 2013

(54) CODE WORD ASSIGNMENT METHODS FOR QUICK PAGING IN TELECOMMUNICATION SYSTEMS

(75) Inventors: Rajaram Ramesh, Raleigh, NC (US); Havish Koorapaty, Cary, NC (US); Kumar Balachandran, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 344 days.

(21) Appl. No.: 12/346,286

(22) Filed: Dec. 30, 2008

(65) Prior Publication Data

US 2009/0280847 A1     Nov. 12, 2009

Related U.S. Application Data

(60) Provisional application No. 61/050,714, filed on May 6, 2008.

(51) Int. Cl.
*H04W 68/00* (2009.01)

(52) U.S. Cl.
USPC ........................................... 455/458; 455/515

(58) Field of Classification Search
USPC ............... 455/415, 458, 515, 426.1, 69, 522, 455/343.1; 370/203, 437, 208, 320, 340, 370/210, 337, 335, 312, 332; 375/260, 299, 375/340
See application file for complete search history.

(56) References Cited

U.S. PATENT DOCUMENTS

| | | | |
|---|---|---|---|
| 8,233,459 B2 | 7/2012 | Higuchi et al. | |
| 2004/0042389 A1* | 3/2004 | Schiff | 370/208 |
| 2004/0258084 A1* | 12/2004 | Laroia et al. | 370/437 |
| 2007/0268975 A1* | 11/2007 | Yoon et al. | 375/260 |
| 2008/0014969 A1* | 1/2008 | Laroia et al. | 455/458 |
| 2008/0057984 A1 | 3/2008 | Willey | |
| 2008/0070598 A1 | 3/2008 | Willey | |
| 2008/0188247 A1* | 8/2008 | Worrall | 455/458 |
| 2008/0254814 A1* | 10/2008 | Harris et al. | 455/458 |
| 2008/0293437 A1* | 11/2008 | Ranganathan et al. | 455/458 |
| 2010/0260112 A1 | 10/2010 | Ramesh et al. | |

FOREIGN PATENT DOCUMENTS

| | | |
|---|---|---|
| JP | H01-227563 | 9/1989 |
| JP | 2000-286789 | 10/2000 |
| JP | 2003-333180 | 11/2003 |
| JP | 2007-300506 | 11/2007 |
| WO | WO 2004/006449 A1 | 1/2004 |

OTHER PUBLICATIONS

CDMA Tutorial, Intuitive Guide to Principles of Communications, Code Division Multiple Access (CDMA), The concept of signal spreading and its uses in communications. WWW.complextoreal. com.*

(Continued)

*Primary Examiner* — Edward Urban
*Assistant Examiner* — Golam Sorowar

(57) ABSTRACT

Code words are assigned to subscriber stations or groups of subscriber stations in a communication network for a quick paging mechanism in which the assigned code words are transmitted as quick paging signals over unused frequency resources to signal the subscriber stations. Subsets of multiple code words from a set of code words can be assigned to respective paging groups, and overlapping subsets can be assigned to multiple paging groups. This enables a single code word to be used to address either a single paging group or multiple paging groups.

28 Claims, 6 Drawing Sheets

(56) References Cited

OTHER PUBLICATIONS

Translation of the First Office Action for the Chinese Patent Application No. 200980126776.5, dated Dec. 27, 2012, 6 pages.
Translation of the Search Report for the Chinese Patent Application No. 200980126776.5, dated Dec. 19, 2012, 3 pages.
Tsai et al. 'Wake-up Signal for 802.16m OFDMA Idle Mode,' IEEE C802.16m07/217r1, Nov. 7, 2007, whole document.
The Official Action dated Apr. 15, 2013 and its English translation from the counterpart Russian Patent Application No. 2010149753, 10 pages.
Official Action dated Jul. 2, 2013 and its English translation from the counterpart Japanese Patent Application No. 2011-508006, 4 pages.

* cited by examiner

CODE WORD ASSIGNMENT METHODS FOR QUICK PAGING IN TELECOMMUNICATION SYSTEMS

CROSS REFERENCE TO RELATED APPLICATIONS

The application claims the benefit of U.S. Provisional Patent Application No. 61/050,714 filed on May 6, 2008, the entirety of which is incorporated here by reference.

TECHNICAL FIELD

This invention relates to radio communication systems and more particularly to paging in such systems.

BACKGROUND

The Institute of Electrical and Electronic Engineers (IEEE) 802.16 Working Group on Broadband Wireless Access Standards is specifying standards for broadband radio communication systems in wireless metropolitan area networks. The IEEE 802.16 family of specifications is called the Wireless Metropolitan Area Network (WirelessMAN) standard and has been dubbed "WiMAX", which is short for Worldwide Interoperability for Microwave Access, by an industry group called the WiMAX Forum. The mission of the WiMAX Forum is to promote and certify compatibility and interoperability of products complying with the IEEE 802.16 specifications.

The WirelessMAN standard defines aspects of the air interface between a radio transmitter and a radio receiver, including the physical (PHY) layer, and the Medium Access Control (MAC) layer. The WiMAX Forum has defined an architecture for connecting a WiMAX network with other networks, such as networks complying with IEEE 802.11 and cellular networks, and a variety of other aspects of operating a WiMAX network, including address allocation, authentication, etc. FIGS. 1A, 1B show examples of WiMAX networks, and it should be understood that the arrangement of functionalities depicted in FIGS. 1A, 1B can be modified in WiMAX and other communication systems. As depicted in FIG. 1A, the network 100A includes base stations (BSs) 102, 104, 106, 108 that respectively transmit and receive radio signals in geographic areas called "cells", which typically overlap to some extent as shown. Subscriber stations (SSs) 110, 112 are located in the cells and exchange radio signals with the BSs according to the WiMAX air interface standard. An SS is typically either a mobile SS (MS) or a fixed SS, and it will be understood that a network can include many cells and many SSs. In FIG. 1A, the BSs communicate with and are controlled by Access Service Network (ASN) Gateways (GANs) 114, 116 that also communicate with each other, and with other core network nodes and communication networks (not shown), such as the public switched telephone network and the internet. SSs, such as SSs 110, 112, can be organized into groups for paging, as described in more detail below.

FIG. 1B depicts a WiMAX network 100B that also includes BSs 102, 104, 106, 108 and SSs 110, 112 as in the network 100A. The network 100B is more decentralized than the network 100A in that, in FIG. 1B, the BSs communicate with each other directly through a suitable routing network 118 that also communicates with other core network nodes and communication networks (not shown).

According to one mode of IEEE 802.16, the downlink (DL) radio signals transmitted by the BSs are orthogonal frequency division multiple access (OFDMA) signals. In an OFDMA communication system, a data stream to be transmitted by a BS to a SS is portioned among a number of narrowband subcarriers, or tones, that are transmitted in parallel. Different groups of subcarriers can be used at different times for different SSs. Because each subcarrier is narrowband, each subcarrier experiences mainly flat fading, which makes it easier for a SS to demodulate each subcarrier.

The DL radio signals and uplink (UL) radio signals transmitted by the SSs are organized as successions of OFDMA frames, which are depicted in FIGS. 2A, 2B according to a time-division duplex (TDD) arrangement in the IEEE 802.16e standard. FIG. 2B is a magnification of FIG. 2A and shows the format of the DL and UL subframes in more detail than in FIG. 2A. In FIGS. 2A, 2B, time, i.e., OFDMA symbol number, is shown in the horizontal direction and subchannel logical number, i.e., OFDM subcarrier frequency, is indicated by the vertical direction. FIG. 2B shows one complete frame and a portion of a succeeding frame, with each DL subframe including sixteen symbols and each UL subframe including ten symbols, not counting guard symbols.

Each DL frame 200 starts with a preamble signal that includes a known binary signal sent on every third OFDM tone or subcarrier, as depicted by FIG. 3. The range of subcarriers shown in FIG. 3 is numbered 0, 3, 6, . . . , 1701, but a preamble can use fewer than that many subcarriers.

As seen in FIGS. 2A, 2B, each frame's preamble is followed by a DL transmission period and then an UL transmission period. According to the standard, the preamble signal is sent in the first OFDM symbol of a frame, which is identified by an index k in FIG. 2B, and is defined by the segment, i.e., one of the three sets of tones to be used, and a parameter IDCell, which is the transmitting cell's identification (ID) information. A SS uses the preamble for initial synchronization of its receiver to the BS (the network), and to determine the location of a frame control header (FCH), which is among the first bursts appearing in the DL portion of a frame. A SS also uses the preambles in signals transmitted by neighboring BSs to synchronize to them for purposes of measurement for handover from one cell to another.

The FCH gives information on the DL signal parameters, including a DL map message (DL-MAP), which is a medium access control (MAC) message that defines DL allocations for data, and parameters relevant for reception of the signal. The DL-MAP may be followed by an UL map message (UL-MAP), which provides UL allocations for data, and other parameters relevant for transmission of signals from an identified SS. With the assignments in time and frequency from the DL-MAP, an identified SS can receive the data in the particular location. Similarly, it can identify assignments in time and frequency on the UL-MAP, and transmit accordingly. FIGS. 2A, 2B also show a transmit/receive transition gap (TTG) interval and a receive/transmit transition gap (RTG) interval, which are used by the BS and SS to switch from transmit to receive and vice versa.

FIG. 2A also illustrates how a BS pages an SS operating in idle mode, showing the relationship between paging cycles, paging offset, BS paging interval, and OFDMA frames. Only two of the succession of paging cycles are shown in FIG. 2A. An SS "listens" for a page message from the BS during only a portion of a paging cycle, and the location of that paging interval is determined by a paging offset from the start of the paging cycle. A paging message can span several OFDMA frames, which the SS needs to demodulate to read the entire message.

Thus, while a SS is idle, the SS periodically turns on its baseband unit, which includes a fast Fourier transform (FFT) demodulator and decoder, even when there are no paging messages for it and no system configuration changes/updates. The SS first synchronizes with the preamble and reads the FCH, and it then reads the DL-MAP to look for the location and the format of a broadcast connection identifier (CID). If the DL-MAP shows a broadcast CID, the SS demodulates that burst to determine whether there is a BS broadcast paging message (MOB_PAG-ADV).

Most of the time, there is no paging message and no action required by an SS, but during each paging interval, an SS has to be fully "awake", which is to say, its receiver has to be powered up, for a number of OFDMA frames, using electrical power and possibly draining a battery over time. For a BS, periodically sending MOB_PAG-ADV messages that require no action also wastes downlink capacity. In addition to MOB_PAG-ADV messages, changes in channel descriptors or broadcast system updates can trigger an idle SS to stay on for updating the system parameters or reading other coming messages.

A "quick" paging mechanism that can reduce the negative effects of the conventional paging mechanism is not specified in current versions of the WiMAX standards. In such a quick paging mechanism, a simple signal would indicate to a group of SSs that a paging signal exists in a subsequently transmitted signal block. Thus far, proposals for quick paging either steal system resources from a system's available resources, thereby reducing system capacity, or occupy transmit and receive gaps in a TDD version of the system, which could lead to issues of compatibility among different device implementations.

A new standard for mobile broadband communication is under development as IEEE 802.16m, which is required to be backward-compatible with products complying with the current WiMAX standards and at the same time should improve performance considerably compared to current WiMAX technology. In developing IEEE 802.16m, a proposal has been made for a quick paging mechanism that is described in IEEE C802.16m07/217, "Wake-up Signal for 802.16m OFDMA Idle Mode" (Nov. 7, 2007). If an SS decodes the quick paging signal correctly, the SS needs to listen to the conventional paging signal; otherwise, the SS can go back to "sleep", thereby saving its resources, such as battery power.

U.S. Provisional Patent Application No. 61/014,471 filed on Dec. 18, 2007, which is now U.S. patent application Ser. No. 12/808.779, filed on Jun. 17, 2010, by the current inventors describes using unused subcarriers (i.e., unused system resources) in a preamble signal to send assigned code words for quick paging. The code words assigned to SSs can include unused conventional preamble sequences and orthogonal sequences, such as Walsh-Hadamard (W-H) sequences, or bi-orthogonal sequences, such as W-H sequences and their inverses. Those patent applications are incorporated here by reference.

For one example, a W-H code word can be used as the signal for quick paging as described in the patent applications cited above. With a 10-MHz-wide WiMAX channel using an FFT of length 1024 bits, the length of the conventional preamble is 284 bits. Thus, there are 568 unused subcarrier positions that can be used for a quick paging signal, and so a W-H code word of length 512 bits can be used. For a 5-MHz-wide WiMAX channel, the FFT size is 512 bits, the preamble length is 143 bits, and so 286 unused subcarrier positions are available for the quick paging signal, thereby allowing use of a W-H code word of length 256 bits. Other channel bandwidths, such as 8.75 MHz, can be accommodated in a similar manner. Each such quick paging code word can identify a respective group of SSs, and the presence of a code word in a DL signal indicates to the SS(s) to which that code word is assigned that those SS(s) are required to read the full paging message in a subsequent DL signal.

Since the use of code words for quick paging functionality, as in the patent applications cited and incorporated above, is new, there are no known existing solutions to the code word assignment problem.

SUMMARY

In accordance with aspects of this invention, there is provided in a transmitting node in a telecommunication system, a method of assigning quick paging code words for paging receivers in the telecommunication system. The method includes sorting receivers into respective quick paging groups based on at least one criterion related to the receivers; and assigning respective quick paging code words from a set of code words to the quick paging groups. Each receiver is sorted into at least two quick paging groups.

In accordance with aspects of this invention, there is provided a transmitting node in a telecommunication system. The node includes a control unit adapted to receive members of a set of quick paging code words and information used for sorting one or more receivers in the telecommunication system into quick paging groups; and a quick paging signal generator, which is responsive to the control unit and which uses the information to sort receivers into quick paging groups and to assign quick paging code words. Receivers are sorted into respective quick paging groups based on at least one criterion related to the receivers, respective quick paging code words from a set of quick paging code words are assigned to the quick paging groups, and each receiver is sorted into at least two quick paging groups.

In accordance with aspects of this invention, there is provided a computer-readable medium having stored instructions that, when the instructions are executed by a programmable processor in a transmitting node in a telecommunication system, cause the processor to carry out a method of assigning quick paging code words for paging receivers in the telecommunication system. The method includes sorting receivers into respective quick paging groups based on at least one criterion related to the receivers; and assigning respective quick paging code words from a set of quick paging code words to the quick paging groups. Each receiver is sorted into at least two quick paging groups.

BRIEF DESCRIPTION OF THE DRAWINGS

The several features, objects, and advantages of this invention will be understood by reading this description in conjunction with the drawings, in which.

DETAILED DESCRIPTION

This description focuses on radio communication systems according to the WiMAX standards, but the artisan will understand that the invention in general covers other wireless communication systems.

This application is concerned with assignment of code words to SSs or groups of SSs for a quick paging mechanism in which code words are transmitted as quick paging signals, similar to the preambles of DL frames, over unused frequency resources to signal the SSs. As an example of that mechanism, the quick paging code word(s) assigned to a particular SS can be unused preamble sequences or a subset of a W-H code; the respective code word(s) are masked by a cell-specific pseudorandom-noise (PN) sequence. A SS determines whether a code word assigned to it was sent by a BS, and based on that determination, the SS can decide to receive a full paging signal in a subsequent OFDMA frame.

One solution to the problem of assigning code words is to divide the SSs into paging groups based on, for example, particular bits in their IDs, such as two or three of the least significant bits, and then to assign a code word to each paging group. A SS would then look for its assigned code word in a received DL signal to determine if the full paging message needs to be read.

Nevertheless, there are problems with that straightforward solution. For example, although the WiMAX standard allows full paging messages for multiple SSs (in multiple paging groups) to be sent in the same frame, the straightforward method allows the notification to be sent to only one paging group. Thus, a notification to a particular SS might have to be delayed until the next paging opportunity, which would lead to diminished paging performance.

The inventors have recognized that subsets of multiple code words from a set of code words can be assigned to respective paging groups, and overlapping subsets can be assigned to multiple paging groups. This enables a single code word to be used to address either a single paging group or multiple paging groups. Moreover, each SS can be sorted into single or multiple paging groups.

Figure 1A:
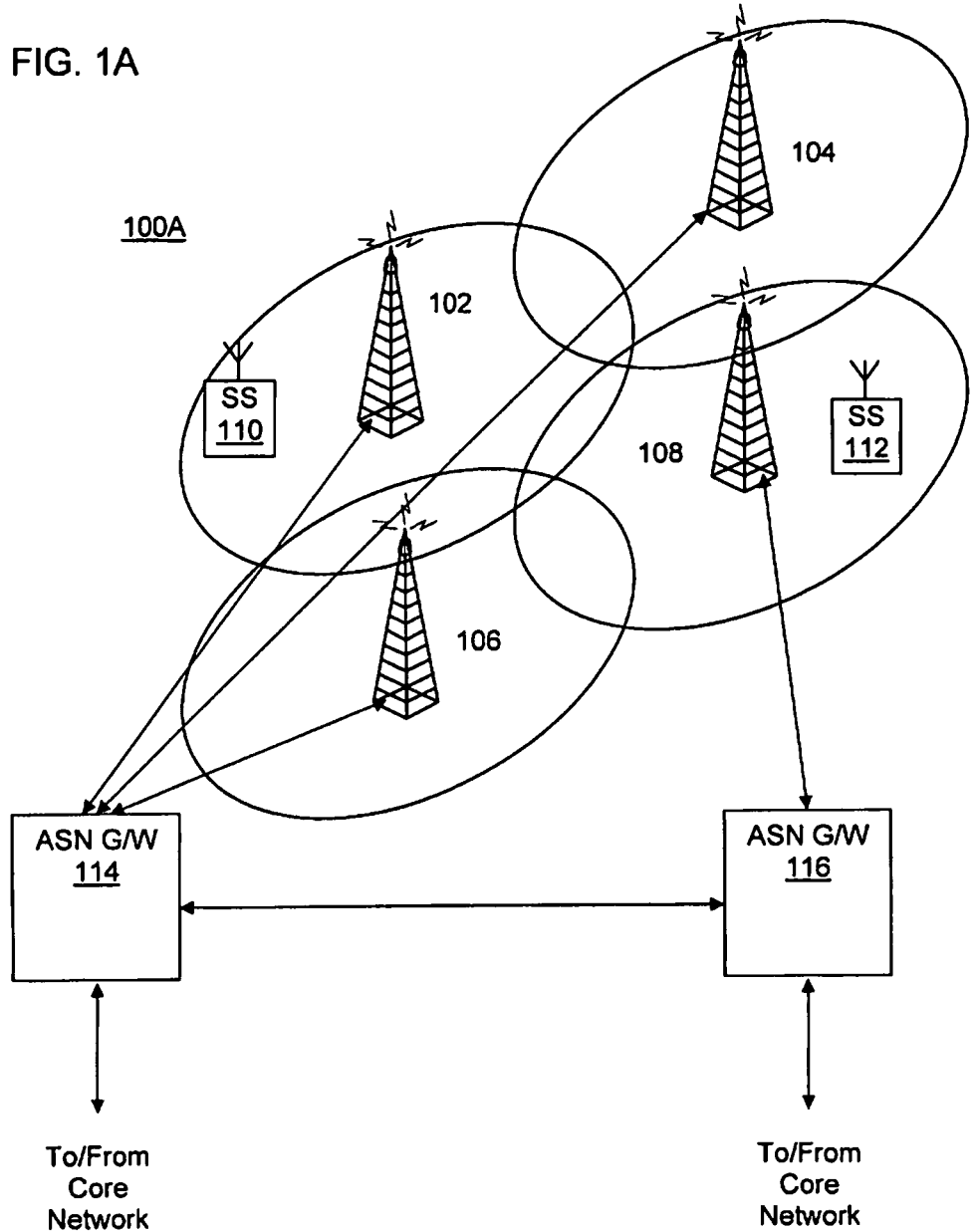
FIGS. 1A, 1B depict examples of telecommunication networks.
Figure 1B:
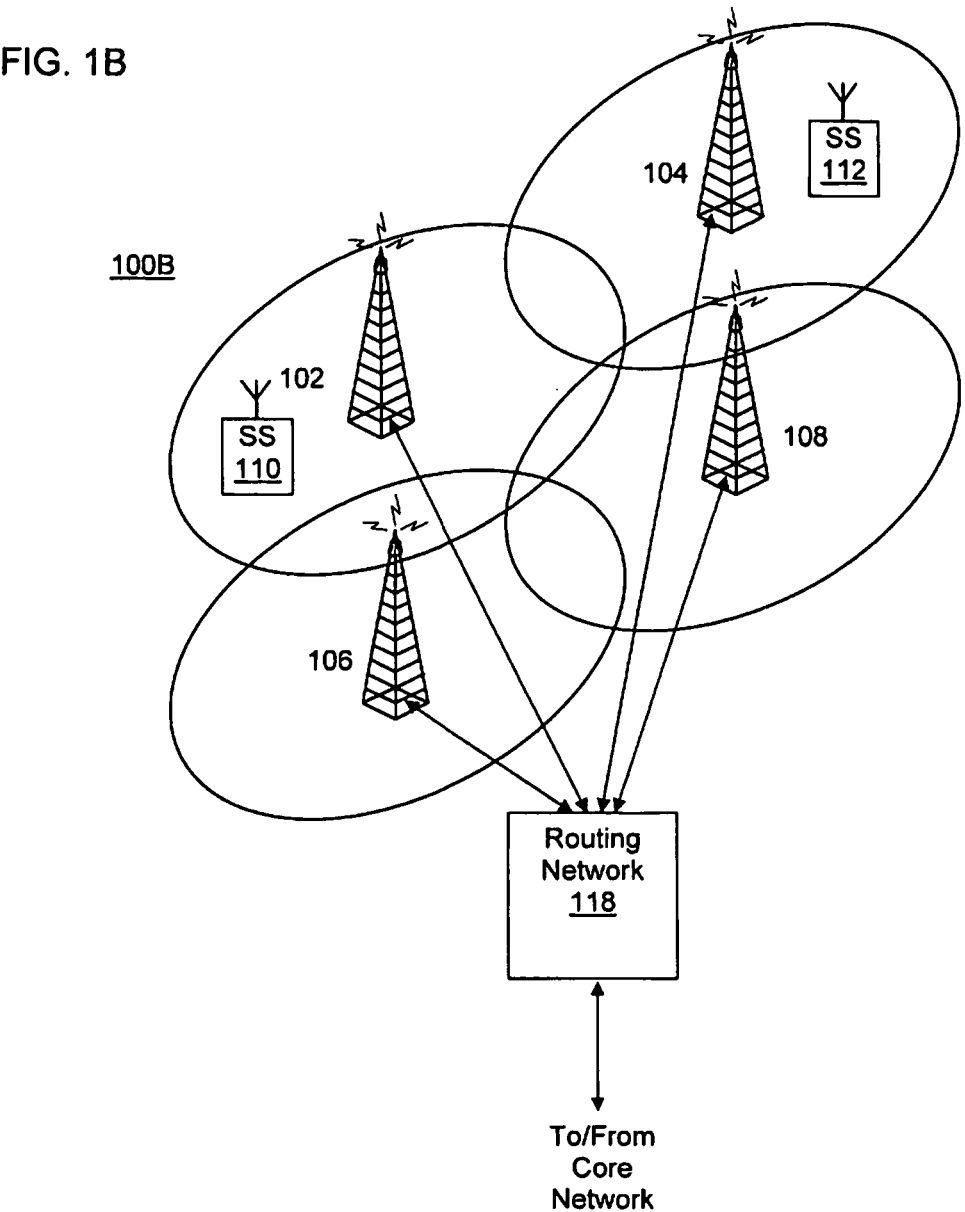
Figure 2A:
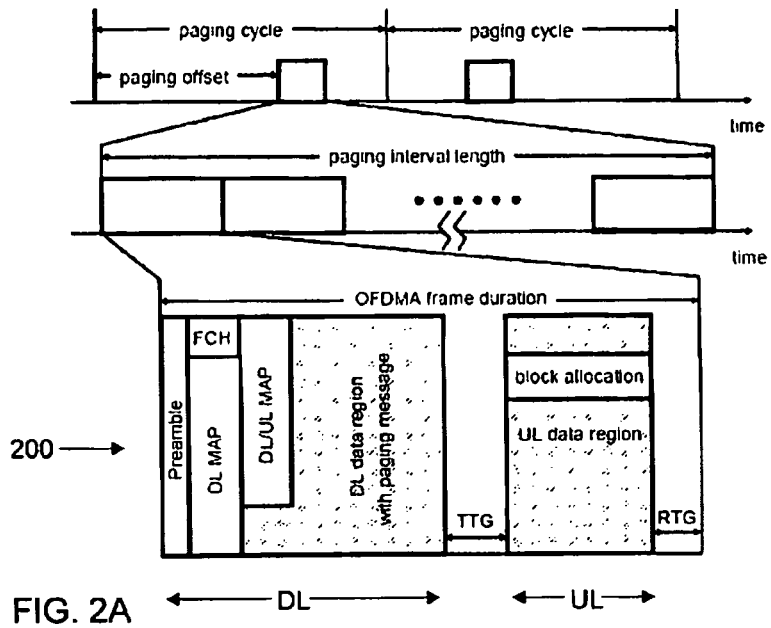
FIGS. 2A, 2B depict downlink and uplink signals organized as successions of frames.
Figure 2B:
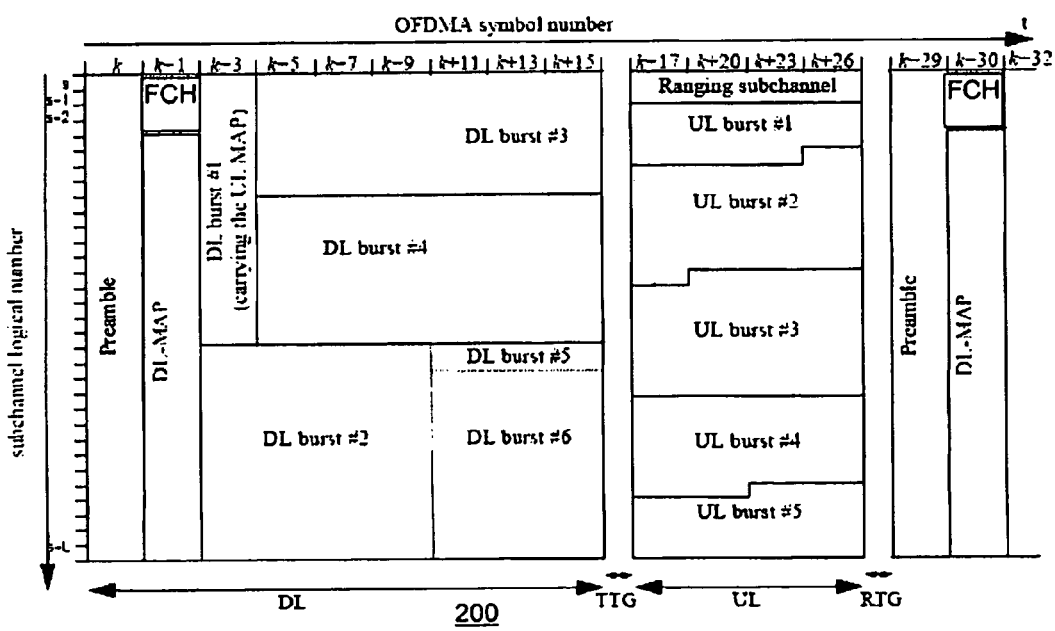
Figure 3:
FIG. 3 depicts an arrangement of subcarriers for preamble signals.
Figure 4:
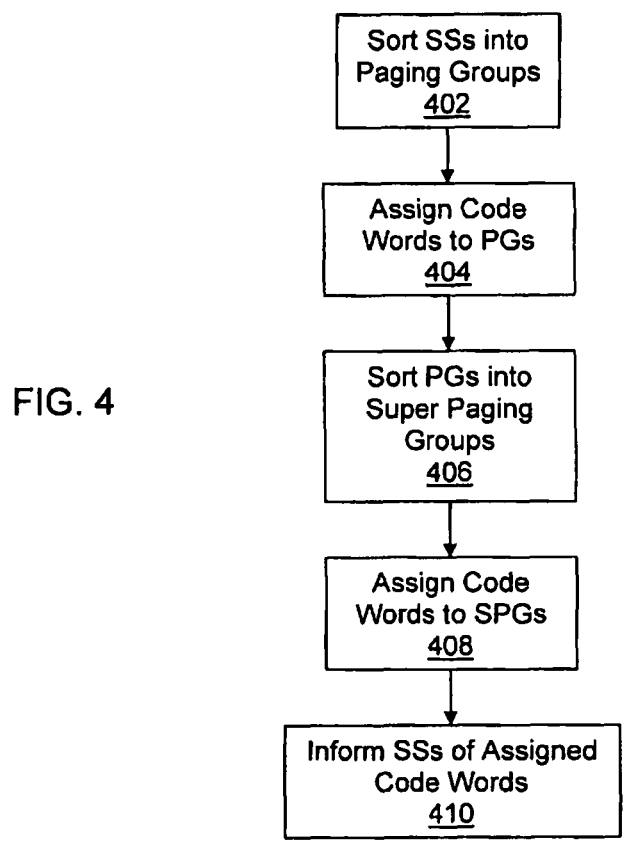
FIG. 4 is a flow chart of a method of assigning quick paging code words.

As illustrated by the flow chart in FIG. 4, a BS or other suitable entity in a network can assign code words by sorting (step 402) the SSs into paging groups (PGs) based on any suitable criterion, e.g., as a function of their IDs as described above. In carrying out step 402, the BS can sort the SSs into paging groups such that each SS belongs to one paging group or to a plurality of paging groups. Each PG is then assigned (step 404) a code word for the respective PG. If desired, the PGs are sorted (step 406) into super-paging groups (SPGs), i.e., sets of a plurality of PGs, and each SPG is assigned (step 408) a respective code word. In any case, the BS assigns (step 410) to each SS the code words assigned to all PGs to which each SS belongs and, if SPGs are used, the code words assigned to all SPGs to which those PGs belong.

As an example of steps 402-408, let there be a plurality of SSs that a BS has sorted into an integer N number of PGs, and let the BS sort the PGs into SPGs such that each SPG includes two PGs. In other words for example, SPG1=PG1+PG2; SPG2=PG1+PG3; SPG3=PG2+PG3 for a case of three PGs. Other arrangements are possible, of course. The BS assigns each of the PGs a different respective code word, and thus there are N code words assigned to the PGs. The BS also assigns a different respective code word to each of the SPGs, and thus there are $N(N-1)/2$ code words assigned to the SPGs. It is currently believed that a BS can carry out such assignment according to substantially any suitable algorithm. Code words can be randomly or arbitrarily assigned to PGs and SPGs as all that is needed is a record of which code words are assigned to which PGs and SPGs.

In general, if each SPG includes k out of N PGs, where k<N, the number of code words assigned to the SPGs is $^{N}C_{k}$, i.e., the number of combinations of N things taken k at a time. It will be noted that the paging groups can be considered as super-paging groups when k=1. The total number of code words assigned to the PGs and the SPGs is $\Sigma^{N}C_{k}$, for all chosen values of k.

The process of assigning code words to paging groups and super-paging groups is continued until either all combinations are exhausted or the set of code words is exhausted. As will be clear from the description below, it is not necessary for all PGs and SPGs to be assigned unique respective code words, which has the benefit of enabling the use of shorter code words. Moreover, it is not necessary for all k to be used, i.e., all integers between and including zero and N, which can reduce the number of unique SPGs and so also reduce the number of code words needed for quick paging.

In step 410 shown in FIG. 4, each SS in a paging group is informed of the code word for its paging group(s) and all code words assigned to all super-paging groups to which the SS's paging group(s) belong. This includes the case when k=1. For example, an SS in PG1 mentioned above is informed of the code words assigned to PG1, SPG1, and SPG2. In order to inform the SS of the assigned code word(s), a BS can send code word index(es) or identifier(s) to a SS in one or more of the messages sent in the course of confirming the SS's registration.

The inventors have also recognized that a BS can assign (step 404 or step 408) a single code word to indicate the case when no SS needs to be notified. This corresponds to a super-paging group with k=0 or a paging group with no members. On receipt of that assigned code word, all SSs can go back to sleep without having to read the full paging message.

The inventors have also recognized that a BS can assign (step 404 or step 408) a code word to indicate the case when all SSs need to be notified. This corresponds to a super-paging group with k=N or a paging group with all SSs known to the BS as members, and can be done even when there are not enough code words for all possible values of k. Thus, the BS can assign code words to super-paging groups for a limited set of k values and also for k=N.

In the examples described above, this can mean that the BS assigns code words for k=1, k=2, and k=N. When SSs in two or fewer paging groups need to be paged, the BS determines the corresponding quick paging code word as described above. When SSs in more than two paging groups in the example need to be notified, the BS can simply use the code word assigned to k=N, and notify all SSs having assigned code words.

The probability of an SS being paged at a particular paging opportunity is typically low, the probability of two SSs being paged simultaneously is typically much lower, and the probability of three SSs being paged simultaneously is typically much, much lower. Thus, assigning code words to super paging groups for a limited set of k values and also for k=N is expected to be able to accommodate most practical cases. In general with the use of k=N, the other k values to use, which in the examples are 1 and 2, are determined mainly by how many SSs are expected to be paged in any frame. In addition, the assignment of a code word to address all SSs is also advantageous in case the BS wants all SSs to read system information that may have been updated.

As described above, the BS in carrying out step 402 can sort the SSs into paging groups such that each SS belongs to a plurality of paging groups, rather than to just one paging group, and need not sort PGs into SPGs. The BS assigns (step 404) a code word to each of the paging groups, and to each SS, the BS assigns (step 410) the code words assigned to all paging groups to which each SS belongs.

In this way, when an SS needs to be paged or otherwise notified, the BS determines the code word assigned to the PG (or possibly the SPG) to which the SS belongs. When one or more SSs to be notified by a quick paging message are sorted into only one paging group, the BS transmits the code word corresponding to that one paging group. When SSs sorted into more than one paging group need to be notified, the BS determines the code word that corresponds to the smallest PG or SPG of which all of those PGs are members. The BS can then send that determined code word. In this way, SSs in multiple paging groups can be efficiently notified with the quick-paging mechanism. It will be understood that in general the paging groups can be of different sizes, i.e., they can include different numbers of SSs.

Figure 5A:
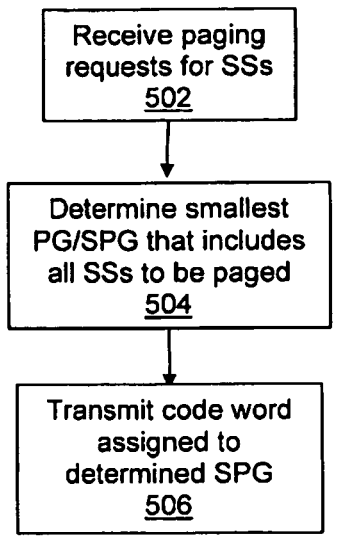
FIG. 5A is a flow chart of a method of quick paging.

FIG. 5A is a flow chart of a method of quick paging one or more SSs by a BS as described above. In step 502, a BS receives a request to page one or more SSs in a conventional way. In step 504, the BS determines the smallest PG or SPG that includes all of the SSs to be paged, and it will be understood that it is possible for the smallest SPG to be a PG, i.e., k=1. In step 506, the BS arranges to transmit the quick-paging code word assigned to the smallest PG or SPG.

Figure 5B:
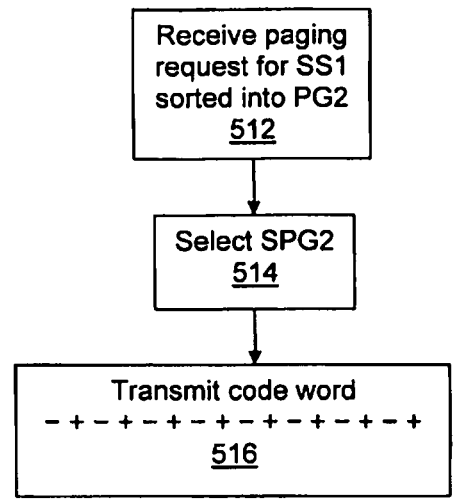
FIGS. 5B, 5C, 5D are flow charts of examples of the method in FIG. 5A.
Figure 5C:
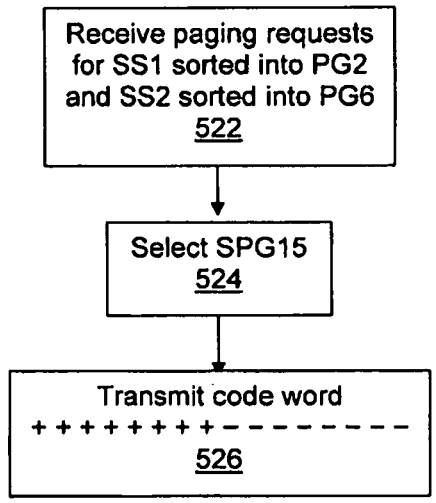
Figure 5D:
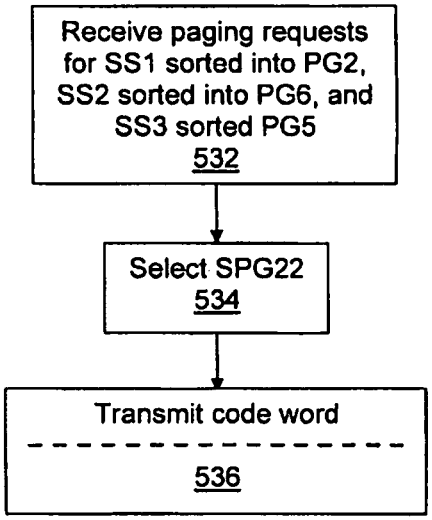

The general method depicted in FIG. 5A is further illustrated by FIGS. 5B, 5C, and 5D that are flow charts of examples based on the following Table 1, which shows the possible results of a BS's sorting N=6 PGs into SPGs and assigning code words from the set of binary W-H code words of length 16 and their inverses. There are sixteen length-16 W-H code words, and so thirty-two code words in total, which are not enough to handle all possible super-paging groups for k=0, 1, 2, 3, 4, 5, and 6. For selected k values of 0, 1, 2, and 6, an example assignment of code words is shown in Table 1, in which the symbol + indicates +1 and the symbol − indicates −1.

TABLE 1

| SPG Number | SPG Composition | Codeword assigned to SPG |
|---|---|---|
| 0 | No PGs | ++++++++++++++++ |
| 1 | PG1 | +−+−+−+−+−+−+−+− |
| 2 | PG2 | −+−+−+−+−+−+−+−+ |
| 3 | PG3 | ++−−++−−++−−++−− |
| 4 | PG4 | −−++−−++−−++−−++ |
| 5 | PG5 | +−−++−−++−−++−−+ |
| 6 | PG6 | −++−−++−−++−−++− |
| 7 | PG1 + PG2 | ++++−−−−++++−−−− |
| 8 | PG1 + PG3 | −−−−++++−−−−++++ |
| 9 | PG1 + PG4 | +−+−−+−++−+−−+−+ |
| 10 | PG1 + PG5 | −+−++−+−−+−++−+− |
| 11 | PG1 + PG6 | ++−−−−++++−−−−++ |
| 12 | PG2 + PG3 | −−++++−−−−++++−− |
| 13 | PG2 + PG4 | +−−+−++−+−−+−++− |
| 14 | PG2 + PG5 | −++−+−−++−−++−−+ |
| 15 | PG2 + PG6 | ++++++++−−−−−−−− |
| 16 | PG3 + PG4 | −−−−−−−−++++++++ |
| 17 | PG3 + PG5 | +−+−+−+−−+−+−+−+ |
| 18 | PG3 + PG6 | −+−+−+−++−+−+−+− |
| 19 | PG4 + PG5 | ++−−++−−−−++−−++ |
| 20 | PG4 + PG6 | −−++−−++++−−++−− |
| 21 | PG5 + PG6 | +−−++−−+−++−−++− |
| 22 | All PGs | −−−−−−−−−−−−−−−− |

FIG. 5B is a flow chart of an example of quick paging one SS, call it SS1 that has been sorted into PG2, by a BS as described above. In step 512, the BS receives a request to page SS1 in a conventional way. In step 514, the BS determines the smallest SPG that includes SS1, which in this example is PG2 or SPG2, i.e., k=1. In step 516, the BS arranges to transmit the quick-paging code word assigned to SPG2, which in Table 1 is −+−+−+−+−+−+−+−+.

FIG. 5C is a flow chart of an example of quick paging SS1 and a second SS, call it SS2 that has been sorted into PG6, by a BS as described above. In step 522, the BS receives requests to page SS1 and SS2 in a conventional way. In step 524, the BS determines the smallest SPG that includes SS1 and SS2, which in this example is SPG15. In step 526, the BS arranges to transmit the quick-paging code word assigned to SPG2, which in Table 1 is ++++++++−−−−−−−−.

FIG. 5D is a flow chart of an example of quick paging SS1, SS2, and a third SS, call it SS3 that has been sorted into PG5, by a BS as described above. In step 532, the BS receives requests to page SS1, SS2, and SS3 in a conventional way. In step 534, the BS determines the smallest SPG that includes SS1, SS2, and SS3, which in this example is SPG22, i.e., k=N. In step 536, the BS arranges to transmit the quick-paging code word assigned to SPG2, which in Table 1 is −−−−−−−−−−−−−−−−.

Among other things, this invention provides a BS with significant flexibility in notifying multiple SSs using the quick paging mechanism described in the patent applications cited and incorporated above. Thus, it enables significant power savings at an SS using that quick paging mechanism and simultaneously preserves system paging performance.

Figure 6:
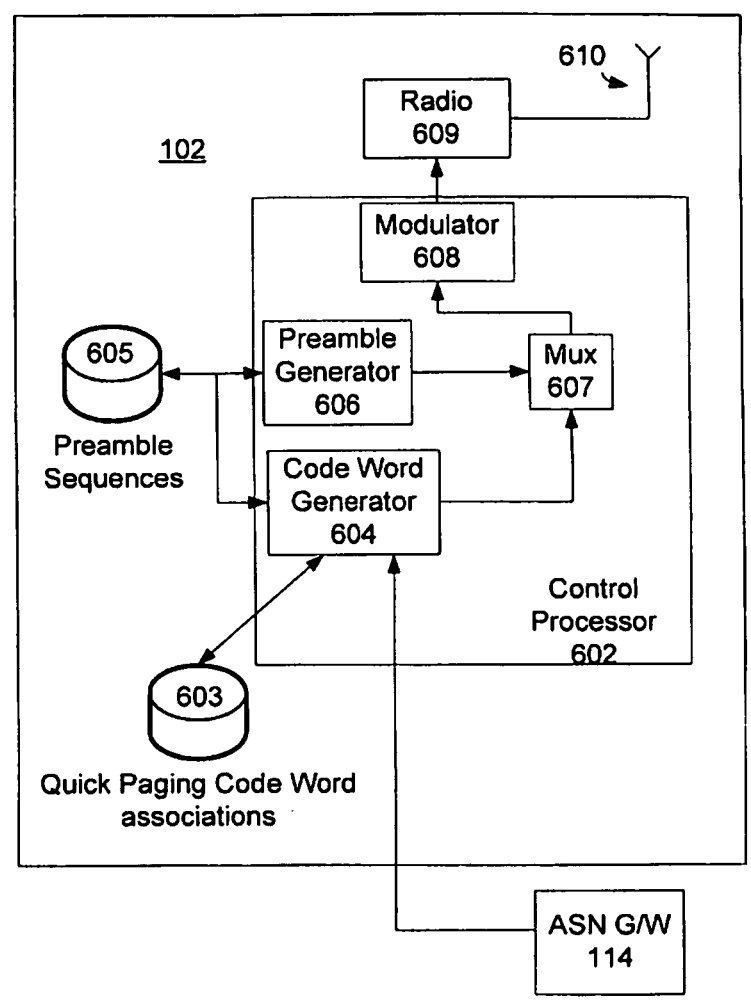
FIG. 6 is a block diagram of a transmitting node in a telecommunication network.

FIG. 6 is a block diagram of a portion of the BS 102, which is typical of other BSs 104, 106, 108 and such transmitting nodes or stations in a WiMAX OFDMA network 100, that can assign and transmit the quick paging code words for the methods described above. It will be appreciated that the functional blocks depicted in FIG. 6 can be combined and re-arranged in a variety of equivalent ways, and that many of the functions can be performed by one or more suitably programmed digital signal processors and other known electronic circuits.

The BS 102 is operated by a control processor 602, which typically and advantageously is a suitably programmed digital signal processor. The control processor 602 typically provides and receives control and other signals from various devices in the BS 102. For simplicity in FIG. 6, the control processor 602 is shown exchanging information with a suitable memory 603, which is a repository of associations between quick paging code words and SSs and other information useful for sorting one or more SSs into PGs and PGs into SPGs as described above.

Such information is provided to a quick paging code word generator 604, which uses the information to sort SSs into paging groups and paging groups into super paging groups, and to assign code words. Typically, the transmitting node 600 would sort those SSs for which the transmitting node 600 is the serving node or preferred cell. The code word generator 604 also generates selected quick paging code words for transmission to one or more SSs and paging groups as described above. For that purpose, the generator 604 can produce suitable code word sequences, such as W-H sequences, or retrieve unused conventional preamble sequences from a preamble sequence memory 605. The quick paging code word generator 604 can also be configured to mask the selected quick paging code words by combining those code words with a PN sequence.

It will be understood that although the generator 604 is depicted in FIG. 6 as part of the control processor 602, this is not necessary; the generator 604 as well as one or more other devices depicted as part of the processor 602 can be implemented by dedicated programmed processors or other suitable logic configured to perform their functions.

A preamble generator 606 also retrieves stored conventional preamble sequences from the memory 605 that are then used for producing the conventional preamble portion of the DL signal transmitted by the BS 102.

The code word generator 604 provides the setup information and/or the selected quick paging code words to a multiplexer 607, which also receives the conventional preamble generated by the generator 606. The multiplexer 607 combines the setup information or code words with the preamble and other data in a DL frame or subframe to be transmitted. The combined information stream produced by the multiplexer 607 is converted by a suitable OFDM modulator 608 into modulation symbols that are provided to an OFDM radio transmitter 609, which impresses the modulation symbols on suitable subcarrier signals. The modulated subcarrier signals are transmitted through a suitable antenna 610.

As described above, the BS 102 is responsive to a request by the network to reach a SS or group of SSs by transmitting the quick paging code word(s) associated with the SS(s). In FIG. 6, such a request is shown as provided through an ASN gateway 114 to control processor 602 and generator 604. In response to the request, the generator 604 retrieves the code word(s) or code word ID(s) associated with the desired SS(s) from the memory 603, and generates the appropriate quick paging signal for transmission by the BS 102.

For example, the control processor 602 receives the IDs of SSs that need to be paged, accesses the database 603 in which the identities of the PGs and possibly SPGs and their corresponding SSs are stored, and produces the identity of the PG or SPG to be paged. The quick paging signal generator 604 then outputs the quick paging code word corresponding to that PG or SPG.

It will be appreciated that procedures described above are carried out repetitively as necessary, for example, to respond to the time-varying nature of communication signals exchanged by transmitters and receivers. Descriptions and examples of principles, aspects, and embodiments of this invention are intended to encompass both structural and functional equivalents, and it is intended that such equivalents include both currently known functional equivalents as well as functional equivalents developed in the future, regardless of structure. The artisan will also appreciate that block diagrams can represent conceptual views of illustrative circuitry embodying the principles of the technology and that flow charts, state transition diagrams, pseudocode, and the like represent processes which may be substantially represented in a computer readable medium and so executed by a computer or programmable processor, whether or not such computer or processor is explicitly shown.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless transceivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. In a transmitting node in a telecommunication system, a method of assigning quick paging code words defined at a physical layer to paging receivers in the telecommunication system, comprising:
   sorting receivers into respective quick paging groups based on at least one criterion related to the receivers, wherein each receiver is sorted into at least two quick paging groups and thereafter belonging to said at least two quick paging groups; and
   assigning respective quick paging code words selected from a set of quick paging code words to the quick paging groups, wherein the set of quick paging code words consisting of orthogonal sequences, bi-orthogonal sequences and unused preamble sequences.

2. The method of claim 1, wherein the at least one criterion is the receiver's identification.

3. The method of claim 1, further comprising assigning a quick paging code word from the set of quick paging code words that corresponds to none of the receivers in at least one of the quick paging groups.

4. The method of claim 1, further comprising assigning a quick paging code word from the set of quick paging code words that corresponds to all receivers.

5. The method of claim 1, further comprising:
   sorting the quick paging groups into super paging groups; and
   assigning respective quick paging code words from the set of quick paging code words to the super paging groups.

6. The method of claim 5, wherein at least one super paging group includes at least two quick paging groups.

7. The method of claim 5, further comprising informing a receiver of at least one quick paging code word assigned to the receiver.

8. The method of claim 7, wherein quick paging code words assigned to a receiver correspond to all quick paging groups and super paging groups to which the receiver belongs.

9. The method of claim 5, further comprising transmitting, to notify at least one selected receiver, a quick paging code word assigned to a quick paging group or super paging group to which the receiver belongs.

10. The method of claim 9, wherein transmitting the quick paging code word assigned includes determining a quick paging code word that corresponds to a smaller of a quick paging group and a super paging group into which the at least one selected receiver is sorted.

11. A transmitting node in a telecommunication system, comprising:
    a control unit adapted to receive members of a set of quick paging code words and information used for sorting one or more receivers in the telecommunication system into quick paging groups; and
    a quick paging signal generator, which is responsive to the control unit and which uses the information to sort receivers into quick paging groups and to assign quick paging code words defined at a physical layer;
    wherein receivers are sorted into respective quick paging groups based on at least one criterion related to the receivers; respective quick paging code words selected from a set of quick paging code words are assigned to the quick paging groups, wherein the set of quick paging code words consisting of orthogonal sequences, bi-orthogonal sequences and unused preamble sequences; and each receiver is sorted into at least two quick paging groups and thereafter belonging to said at least two quick paging groups.

12. The node of claim 11, wherein the at least one criterion is the receiver's identification.

13. The node of claim 11, wherein a quick paging code word from the set of quick paging code words is assigned such that the assigned quick paging code word corresponds to none of the receivers in at least one of the quick paging groups.

14. The node of claim 11, wherein a quick paging code word from the set of quick paging code words is assigned such that the assigned code word corresponds to all receivers.

15. The node of claim 11, wherein the quick paging signal generator uses the information to sort quick paging groups into super paging groups, and respective quick paging code words from the set of quick paging code words are assigned to the super paging groups.

16. The node of claim 15, wherein at least one super paging group includes at least two quick paging groups.

17. The node of claim 15, wherein, to notify at least one selected receiver, the control unit is configured such that a quick paging code word assigned to a quick paging group or super paging group to which the receiver belongs is transmitted.

18. The node of claim 15, wherein the quick paging code word assigned is determined that corresponds to a smaller of a quick paging group and a super paging group into which the at least one selected receiver is sorted.

19. A non-transitory computer-readable medium having stored instructions that, when the instructions are executed by a programmable processor in a transmitting node in a telecommunication system, cause the processor to carry out a method of assigning quick paging code words defined at physical layer to paging receivers in the telecommunication system, wherein the method comprises:
    sorting receivers into respective quick paging groups based on at least one criterion related to the receivers, wherein each receiver is sorted into at least two quick paging groups and thereafter belonging to said at least two quick paging groups; and
    assigning respective quick paging code words selected from a set of quick paging code words to the quick paging groups, wherein the set of quick paging code words consisting of orthogonal sequences, bi-orthogonal sequences and unused preamble sequences.

20. The medium of claim 19, wherein the at least one criterion is the receiver's identification.

21. The medium of claim 19, wherein the method further comprises assigning a quick paging code word from the set of quick paging code words that corresponds to none of the receivers in at least one of the quick paging groups.

22. The medium of claim 19, wherein the method further comprises assigning a quick paging code word from the set of quick paging code words that corresponds to all receivers.

23. The medium of claim 19, wherein the method further comprises:
    sorting the quick paging groups into super paging groups; and
    assigning respective quick paging code words from the set of quick paging code words to the super paging groups.

24. The medium of claim 23, wherein each super paging group includes at least two quick paging groups.

25. The medium of claim 23, wherein the method further comprises informing a receiver of at least one quick paging code word assigned to the receiver.

26. The medium of claim 25, wherein quick paging code words assigned to a receiver correspond to all quick paging groups and super paging groups to which the receiver belongs.

27. The medium of claim 23, wherein the method further comprises transmitting, to notify at least one selected receiver, a quick paging code word assigned to a quick paging group or super paging group to which the receiver belongs.

28. The medium of claim 27, wherein transmitting the quick paging code word assigned includes determining a quick paging code word that corresponds to a smaller of a quick paging group and a super paging group into which the at least one selected receiver is sorted.

* * * * *

UNITED STATES PATENT AND TRADEMARK OFFICE
CERTIFICATE OF CORRECTION

PATENT NO. : 8,538,464 B2  
APPLICATION NO. : 12/346286  
DATED : September 17, 2013  
INVENTOR(S) : Ramesh et al.

Page 1 of 1

It is certified that error appears in the above-identified patent and that said Letters Patent is hereby corrected as shown below:

In the Specification

In Column 1, Line 52, delete "(GANs)" and insert -- (G/Ws) --, therefor.

In Column 3, Line 44, delete "12/808.779," and insert -- 12/808,779, --, therefor.

In Column 4, Line 64, delete "focuses" and insert -- focusses --, therefor.

Signed and Sealed this  
Thirty-first Day of December, 2013

Margaret A. Focarino  
*Commissioner for Patents of the United States Patent and Trademark Office*